United States Patent
Shaham et al.

(10) Patent No.: US 9,792,657 B2
(45) Date of Patent: Oct. 17, 2017

(54) METHODS AND SYSTEMS FOR LEVERAGING SOCIAL INFORMATION, INCLUDING A SOCIAL GRAPH, TO IDENTIFY AND PRESENT CONTENT OF INTEREST

(75) Inventors: Yoav Shaham, Ramat Hasharon (IL); Assaf Henkin, Tel Aviv (IL); Itai Brickner, Tel Aviv (IL); Stanislav Krichevsky, Petah Tiqwa (IL)

(73) Assignee: Amobee, Inc., San Diego, CA (US)

( * ) Notice: Subject to any disclaimer, the term of this patent is extended or adjusted under 35 U.S.C. 154(b) by 173 days.

(21) Appl. No.: 13/410,069

(22) Filed: Mar. 1, 2012

(65) Prior Publication Data

US 2012/0233256 A1 Sep. 13, 2012

Related U.S. Application Data

(60) Provisional application No. 61/448,091, filed on Mar. 1, 2011.

(51) Int. Cl.
| | |
|---|---|
| *G06F 15/16* | (2006.01) |
| *G06Q 50/00* | (2012.01) |
| *G06Q 30/02* | (2012.01) |
| *G06F 17/30* | (2006.01) |

(52) U.S. Cl.
CPC ....... *G06Q 50/01* (2013.01); *G06F 17/30873* (2013.01); *G06Q 30/02* (2013.01)

(58) Field of Classification Search
CPC .. G06F 17/3053; G06F 21/6218; G06F 17/30; G06F 17/30873; G06F 9/541; H04L 12/588; H04L 51/32; H04L 67/1044; H04L 67/306

USPC .......... 709/204, 217, 224; 706/45; 707/600–606, 794; 726/27–30
See application file for complete search history.

(56) References Cited

U.S. PATENT DOCUMENTS

| | | | | |
|---|---|---|---|---|
| 8,073,947 | B1 * | 12/2011 | Yeh ................... | G06F 17/30864 709/224 |
| 8,626,775 | B1 * | 1/2014 | Harinarayan ..... | G06F 17/30864 707/749 |
| 2008/0091797 | A1 * | 4/2008 | Busey .................. | G06Q 10/00 709/217 |

(Continued)

*Primary Examiner* — Farid Homayounmehr
*Assistant Examiner* — Lizbeth Torres-Diaz
(74) *Attorney, Agent, or Firm* — Schwegman Lundberg & Woessner, P.A.

(57) ABSTRACT

Techniques for leveraging social information, including a social graph, to identify content likely to be of interest to a user are described. With some embodiments, a content enhancement server receives a request for web-based content that is to be presented with a web page that is being presented at a client computing device. The server will then identify some web-based content that is relevant to a topic or subject matter of the web page, and also popular as determined by analyzing some social information, including in some instances information relating to asocial graph of the viewing user, that is associated with the web-based content. Finally, some items of web-based content are selected, based on a combination of the content's relevance and popularity as indicated by the analysis of the social information. The selected web content is then communicated to the client computing device for presentation with the web page.

12 Claims, 8 Drawing Sheets

(56) References Cited

U.S. PATENT DOCUMENTS

| | | | |
|---|---|---|---|
| 2008/0177994 A1* | 7/2008 | Mayer | G06F 9/4418 713/2 |
| 2009/0063265 A1* | 3/2009 | Nomula | G06F 17/30864 705/14.66 |
| 2009/0125511 A1* | 5/2009 | Kumar | G06Q 10/107 |
| 2010/0036806 A1* | 2/2010 | Lam | G06F 17/3087 707/706 |
| 2010/0094878 A1* | 4/2010 | Soroca | G06F 17/30035 707/748 |
| 2010/0223581 A1* | 9/2010 | Manolescu | G06Q 10/00 715/853 |
| 2012/0131013 A1* | 5/2012 | Hobbs | G06F 17/30283 707/748 |
| 2012/0143921 A1* | 6/2012 | Wilson | G06Q 50/01 707/798 |
| 2013/0159298 A1* | 6/2013 | Mason | G06F 17/30867 707/728 |

\* cited by examiner

RELATED ARTICLES STREAM

Motorola Reveals Droid Bionic, Xoom for Verizon
Motorola announced the DROID BIONIC smartphone and XOOM tablet for Verizon, both supporting the new 4G LTE network.
115 like(s)
social_score=0.7539

The HP Slate is Finally Official; It Costs $800!
The HP Slate is Finally Official; It Costs $800! : Please, stifle your incredulous gasps, we don't want to scare it away.
28 like(s)
social_score=0.6059

Why the Motorola Xoom will Succeed
I've been following the slew of tablets that are forthcoming for 2011, but none have really excited me in the same way as the Motorola Xoom. The Xoom has quickly rose to the top of the Android tablet buzz, thanks to a variety factors. Below are three reas
20 like(s)
social_score=0.5824

Tegra 2-powered Xoom Tab in Best Buy Feb. 24
You%u2019ve been coveting the Motorola Xoom since it was announced at CES during the first week of January....
18 like(s)
social_score=0.5355

METHODS AND SYSTEMS FOR LEVERAGING SOCIAL INFORMATION, INCLUDING A SOCIAL GRAPH, TO IDENTIFY AND PRESENT CONTENT OF INTEREST

CLAIM OF PRIORITY

This patent application claims the benefit of priority, under 35 U.S.C. §119(e), to U.S. Provisional Patent Application Ser. No. 61/448,091, entitled "METHODS AND SYSTEMS FOR LEVERAGING SOCIAL INFORMATION, INCLUDING A SOCIAL GRAPH, TO IDENTIFY AND PRESENT CONTENT OF INTEREST," filed on Mar. 1, 2011, which is hereby incorporated by reference herein in its entirety.

TECHNICAL FIELD

The present disclosure generally relates to data processing techniques for presenting web content. More specifically, the present disclosure relates to methods and systems for leveraging social information, including social graph information, to identify and present web content likely to be of interest to a user.

BACKGROUND

Web or network-based applications having a social aspect are increasing in both quantity and popularity. For example, websites such as Facebook®, Twitter®, and LinkedIn®—just to name a few—are fast becoming some of the most visited websites on the Internet. Although each of these social network services are quite different, they share in common some key concepts. For instance, each of these social network services allows a user of the service to define his or her relationships with other users, and in some instances, other objects or entities. This concept of a digital mapping of personal relationships has been referred to as a social graph.

DESCRIPTION OF THE DRAWINGS

Some embodiments are illustrated by way of example and not nation in the figures of the accompanying drawings, in which.

DETAILED DESCRIPTION

The present disclosure describes methods and systems for enhancing a requested web page by displaying with the requested web page additional web content selected for being relevant with respect to the web content of the requested web page, and based on an analysis of various sources of social information. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with some embodiments of the present invention, a content enhancement server is used to enhance a web page that is requested by, and displayed to, a user via a web browser application executing on a client computing device. The content enhancement server enhances the web page by adding to the web page some additional web content that is selected for being of potential interest to the viewing user. As used herein, the original requested web page is referred to as the "source web content" or "source web page," whereas the additional web content that is presented as an enhancement to the requested web page is referred to as the "target web content" or "target web page." The target web content that is selected for presentation with the source web page is selected based on a combination of factors including its relevance with respect to the source web page that has been requested by the user, and based on an analysis of social information associated with the target web content. By using this combination of factors, the target web content that is selected for presentation to the user is more likely to be of interest to the user than any content that might be selected based on a single factor, such as relevance, alone, or social information, alone.

With some embodiments, the content enhancement server will not have access to information indicating the identity of the viewing user of the source web page. In such instances, the target web content that is selected for presentation with the source web page may include a Uniform Resource Locator (URL) and corresponding hyperlink for each of one or more target web pages that have previously been determined to have web content that relates to the web content of the source web page. For example, if a user requests a web page presenting a particular news article on a particular topic or subject matter, the additional web content (i.e., target web content) that is presented with the requested web page may include one or more URL's with corresponding hyperlinks to web pages with news articles or blog postings relating to the same topic or subject matter with which the requested source web page relates. In addition to selecting URL's for web pages having related web content, the content enhancement server will select those relevant web pages that are deemed the most popular, based on an analysis of various social information associated with the target web pages. In such instances, the social information that is used to select the target web content that is presented with the source web page will include publicly available social information, as opposed to social information that is specific to a social graph of a particular user, and therefore obtainable only with authorization from, and access to the identity of, the viewing user.

With some embodiments, a single type of publicly available social information (e.g., the number of comments associated with an item of content, or, the number of times a particular item of content has been shared via a particular social network service) may be used to assess the popularity of a particular item of web content. Alternatively, with some embodiments, a combination of different types of social information may be used. For example, with some embodiments, publicly available social information may be obtained from multiple sources, and then combined in some manner to derive a popularity score. In general, the publicly available social information may include information derived from the activities of users who are using some social service to take sonic action with respect to a particular item of web content. For example, the publicly available information may include information indicating the number of user comments posted for a particular item of web content, or the number of times that a particular item of web content has been bookmarked, shared, "tweeted", "re-tweeted", "plus one'd", or "liked"—collectively referred to herein as indications of interest. Accordingly, after the content enhancement server has identified a set of web pages that are related to the web content of the source web page, these identified target web pages may be ranked or ordered based on their corresponding popularity scores. The content enhancement server may ultimately select only a predetermined number of target web pages with the highest popularity score for presentation with the source web page. With some embodiments, the combination of a relevance factor or score and a popularity factor or score, is referred to simply as a social score. As such, with some embodiments, the content enhancement server will select for presentation with the source web page a predetermined number of items of target web content that have the greatest social scores.

In general, the publicly available social information that is used to rank or order, and ultimately select, the target web content may be obtained in one of several ways. In some instances, the social information may be obtained from the target web content itself. For example, with some embodiments, the popularity score for an item of web content may be based in whole or in part on a count of the number of persons who have commented on the item of web content (e.g., a blog posting, or a news article). Accordingly, with some embodiments, the content enhancement server will request, receive, and then analyze a current version of the target web page to determine the total number of users who have commented. This information is stored in association with some identifying property of the target web content, such as a URL or some other proprietary identifier assigned to the web content, so that it can be recalled when needed. Similarly, many web pages may include social information associated with any one or more of many existing social network services. For example, many social network services allow users to share web content with other users of the service. As such, many web pages include social information such as a count of the number of persons who have shared some item of web content with others via a particular social network service. As with the case of analyzing comments, the content enhancement server can parse a web page to identify the relevant social information. In some instances, the publicly available information is obtained by querying a social network service, for example, via an application programming interface (API) request. For instance, many social network services provide various public interfaces (e.g., API's) through which various social information may be obtained. For example, the content enhancement server may communicate an API request to a social network service, such that the request identifies some item of web content by its URL, and the social network service responds with a count of the number of persons who have bookmarked the item of web content, shared the item of web content, indicated a "like" for the item of web content, or a count of persons who have taken some other action with respect to the item of web content.

With some embodiments, the content enhancement server will have access to information indicating the identity of the viewing user of the source web page. In such instances, the content enhancement server may customize the target web content that is displayed to the user, for example, by selecting web content that is specific to the social graph of the user viewing the source web page. For example, if a viewing user requests a web page with web content related to a particular topic or subject matter, the content enhancement server may access one or more social network services to obtain web content that is specific to the viewing user's social graph. This web content may be selected from a personalized data feed or data stream for the viewing user. Similarly, the selected social graph information may be messages, such as network or status update messages posted via a social network service (e.g., Facebook®, LinkedIn®, and so forth), microblog postings (e.g., tweets via Twitter®), shared web pages or URL's, and so forth. The social graph information may be obtained, for example, by querying a social network service with an appropriate API request. With some embodiments, upon receiving a response from a social network service, the content enhancement server may first identify the relevant web content from a user's social graph, and then rank or rate the relevant web content based on some additional social graph information, such as the relationship that the viewing user has with the source of the identified web content. If, for example, the source or author of a relevant item of web content (e.g., a status update, or tweet) is a direct connection (e.g., a friend, or first-level connection), as defined by some social network service, the item of web content may be deemed of greater interest to the viewing user than a similar item of web content that was authored by an indirect connection (e.g., a friend of a friend, and so forth). In general, the shorter the distance within a user's social graph between the source of information and the viewing user, the more likely the web content is to be of interest to the viewing user. These and other aspects of the inventive subject matter are set forth below in connection with the description of the various figures.

Figure 1:
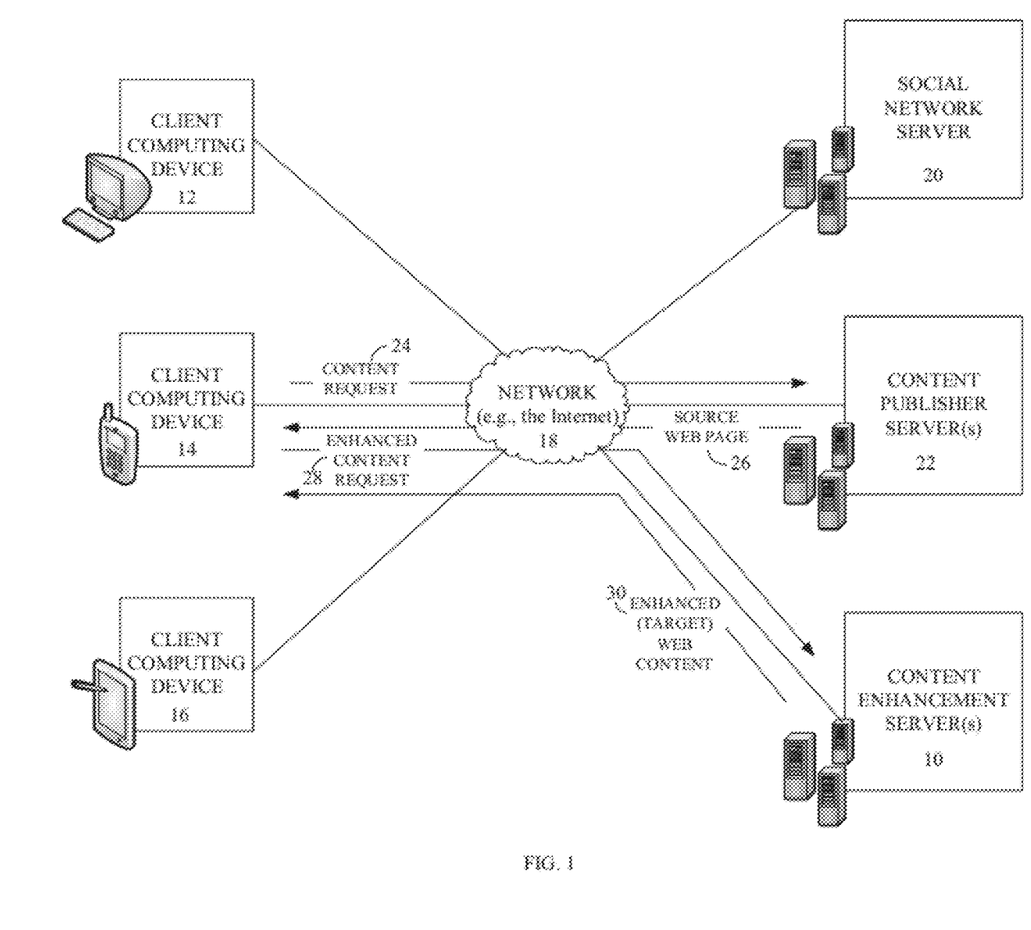
FIG. 1 illustrates a network diagram showing some of the various computing devices forming a computer network, including a content enhancement server according to some embodiments of the invention.

FIG. 1 illustrates a network diagram showing some of the various server computers forming a computer network, including a content enhancement server 10 according to some embodiments of the invention. As illustrated in FIG. 1, a variety of client computing devices (e.g., with reference numbers 12, 14 and 16) are shown communicatively coupled to a network 18 (e.g., the Internet) so as to be capable of exchanging data with a social network server 20, a content publisher server 22, and a content enhancement server 10. The client computing devices may be any type of computing device, including desktop or laptop computers, as well as mobile computers, such as mobile handsets or tablet computing devices.

In general, a web browser application, or some other client application capable of rendering and presenting web content, will direct a content request 24 for a web page to a content publisher server 22, such content referred to herein as the source web content, or source web page 26. In response, the content publisher server 22 will communicate the source web content or web page 26 to the requesting client computing device 14. The web content 26 that is communicated to the client computing device 14 includes a tag, or a script, or some other item of information which, when processed at the client computing device 14, causes a content request (e.g., an enhanced content request 28) to be communicated to the content enhancement server 10. The content enhancement server 10 will process the received content request, and respond by communicating enhanced (target) content 30 to the client computing device. This enhanced content is selected by the content enhancement server for being relevant (e.g., related by topic or subject matter) to the source web content in the web page 26 communicated to the client computing device by the content publisher, and for being popular, based on various social information associated with the enhanced web content.

Figure 2:
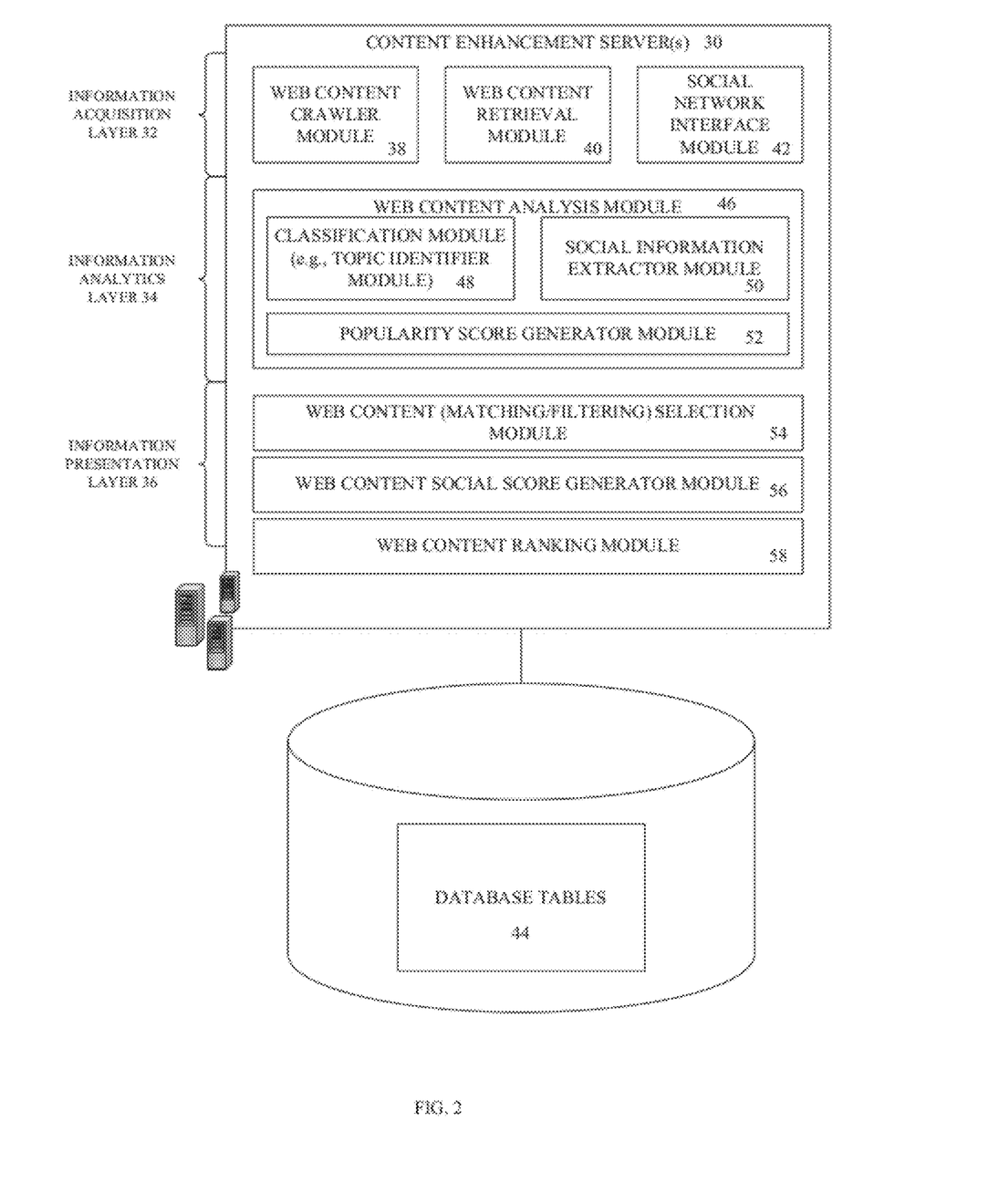
FIG. 2 is a functional block diagram of a content enhancement server, consistent with some embodiments of the invention.

FIG. 2 is a functional block diagram of a content enhancement server 10, consistent with some embodiments of the invention. As illustrated in FIG. 2, the content enhancement server includes various processing layers, such as the information acquisition layer 32, the information analytics layer 34, and the information presentation layer 36. In general, the information acquisition layer 32 includes the various functional modules that obtain web content and web pages. Once obtained, the web content or web pages are analyzed by one or more modules in the information analytics layer 34. Accordingly, the information analytics layer 34 generally includes the functional modules responsible for processing and analyzing the web content received from the information acquisition layer 32. Finally, the information presentation layer 36 includes the functional modules that are responsible for identifying and then presenting enhanced content (i.e., target web content for presentation with a source web page), when requested by a client computing device.

As illustrated in FIG. 2, the information acquisition layer 32 include a web content crawler module 38, a web content retrieval module 40 and a social network interface module 42. Each of these three modules performs a different information acquisition function. For example, the web content crawler module 38 is an automated crawler or bot that systematically retrieves web pages so that the web content of the web pages can be analyzed, indexed and stored for subsequent retrieval. For instance, the crawler module 38 operates in the background to retrieve web content that is then analyzed (e.g., by the information analytics layer 34), and stored in various database tables 44.

The web content retrieval module 40 functions to request web content from a client computing device. For example, with some embodiments, when a client computing device renders a source web page received from a content publisher, a script associated with a tag on the source web page wilt cause the client to communicate a request to the content enhancement server 10. The request includes some type of web page identifier, generated by the script associated with the tag. When the web page identifier is received at the content enhancement server, the content enhancement server will verify whether the web page associated with the web page identifier has recently been analyzed by the content enhancement server. For example, the content enhancement server may include a cache of recently received and processed web pages. If the web page associated with the web page identifier has been recently received and processed at the content enhancement server 10, then the content enhancement server need not request from the client a copy of the web content of the web page. However, if the web page identifier is not in the cache, or is in the cache but stale, the web content retrieval 40 module may communicate a request to the client device, requesting that the client device communicate the web content of the web page to the content enhancement server 10. With some embodiments, when the client receives a request to communicate the source web content to the content enhancement server, the client will communicate the web content of the web page in predetermined sized chunks. As such, the content enhancement server may only request a number of chunks of the source web content that is sufficient to allow the content enhancement server to perform any necessary analysis of the web page—including, for example, determining the topic of subject matter to which the web page relates, and, ascertaining the necessary social information from the web page.

With some embodiments, the social network interface module 42 provides an interface to one or more social network services, or similar web-based services that can provide social information with which the popularity of a target web page can be derived. In addition, when the identify of a user is known to the content enhancement server 10, the social network interface module 42 can query one or more web-based services (e.g., social network services) for information specific to that particular user's social graph. Accordingly, the social network interface module 42 enables the content enhancement server 10 to communicate API requests to various web-based services to ascertain both publicly available social information, as well as social graph information that is specific to a particular user.

As illustrated in FIG. 2, the web content analysis module 46 includes a classification module 48, a social information extractor module 50, and a popularity score generator module 52. In general, the web content analysis module 46 analyzes web content by parsing received web content to generate classification information (e.g., topics or subject matter information) for various web pages, and to identify social information and derive popularity scores based on the social information.

For example, the classification module 48 (also referred to as a topic identifier module) analyzes web content received via the information acquisition layer, and assigns the web content to one or more topics or subject matters based on an analysis of the web content (including the text of the web content). With some embodiments, the methodology used to classify web content (e.g., to identify the topics to which the web content relates) is similar, or the same, as described in U.S. patent application Ser. No. 11/732,694. The result of this analysis is then stored in one or more database tables 44, so that it can be recalled later when needed. As web pages are often dynamic in nature, the resulting analysis is time stamped when stored in the database or cache so as to indicate the time at which the web content was analyzed. Accordingly, various caching algorithms may be used to assess whether any particular stored record is stale, in view of the time at which the web content was analyzed as indicated by the corresponding timestamp.

The social information extractor module 50 analyzes web content by parsing the web content to identify social information concerning the web content. For example, when a web page includes certain social information (e.g., such as a list of user comments, or some text indicating the total number of user comments, or the total number of times that the content has been shared via some social application), the social information extractor module 50 parses the web content to identify the social information. Once identified, this social information is stored in association with some identifier (e.g., URL or proprietary ID) for the web content so that it can quickly be recalled when needed. With some embodiments, the social information identified by the social information extractor module 50 may be used to derive a popularity score for the particular item of web content. For example, the popularity score generator module 52 may receive social information from the social information extraction module 50, and/or the social network interface module 42, and then compute or otherwise derive a popularity score that represents a measure of the popularity of a particular item of web content. With some embodiments, multiple sources of social information may be used to derive a popularity score for an item of web content. For example, the popularity score may be based on both a count of user comments and a number of times that the content has been shared (e.g., via a tweet or re-tweet, or via a status update, or some other social application). With some embodiments, various algorithms may be used to assign different sources of social information different weights when deriving the popularity score for a particular item of web content. In some embodiments, the particular algorithm used to derive a popularity score may be selected based on the type of web content (e.g., news article, blog, recipe, etc.), or the topic to which the web content relates.

The information presentation layer 36 includes the various modules that are responsible for selecting and presenting target web content in association with a source web page. Accordingly, upon receiving a request for enhanced target web content to be displayed with a source web page, if the classification information for the source web page is not already known, the classification module 48 will analyze the content of the source web page to determine the appropriate classification (e.g., topic or subject matter) for the source web page. Then, the web content selection module 54 will identify the items of web content that have matching topics or subject matters. As the target web content has been previously analyzed, and the result of that analysis is stored in the database tables, or cache, the selection of the target web content is in some instances a database lookup operation. Once the web content selection module 54 has identified the set of items of target web content that are relevant (e.g., related by topic or subject matter) with respect to the source web content, the web content social score generator module 56 derives a social score for each selected item of web content. With some embodiments, the social score is a combination of a relevance score e.g., representing a measure of the relatedness between an item of target web content and the source web content) and a popularity score (representing a measure of the popularity of the item of target web content based on various social information). The web content ranking module 58 then ranks or orders the target web content items based on their respective social scores. Depending upon the particular context in which the web content is to be presented, a predetermined number of content items with the highest social scores are selected, and communicated to the client &vice for presentation with the source web content.

The manner (e.g., format and layout) in which the target web content items are presented with the source web page can vary greatly from one implementation to the next. For example, with some embodiments, a widget, content module, frame, or some other user interface element may be dedicated for the presentation of the target web content items, such that the target web content items are presented simultaneously (e.g., embedded) within the source web page. In other embodiments, the target web content items may be presented via dynamic user interface elements, such as pop-up windows or content boxes, and similar user interface elements. With some embodiments, various target content items may be associated with certain keywords or phrases in the source web page, such that when a user selects, or manipulates a cursor device to hover over, the keyword or phrase, the target content items are presented in a pop-up windows or content box. Accordingly, with some embodiments, different target web content items may be selected for presentation with different keywords or phrases.

Figure 3:
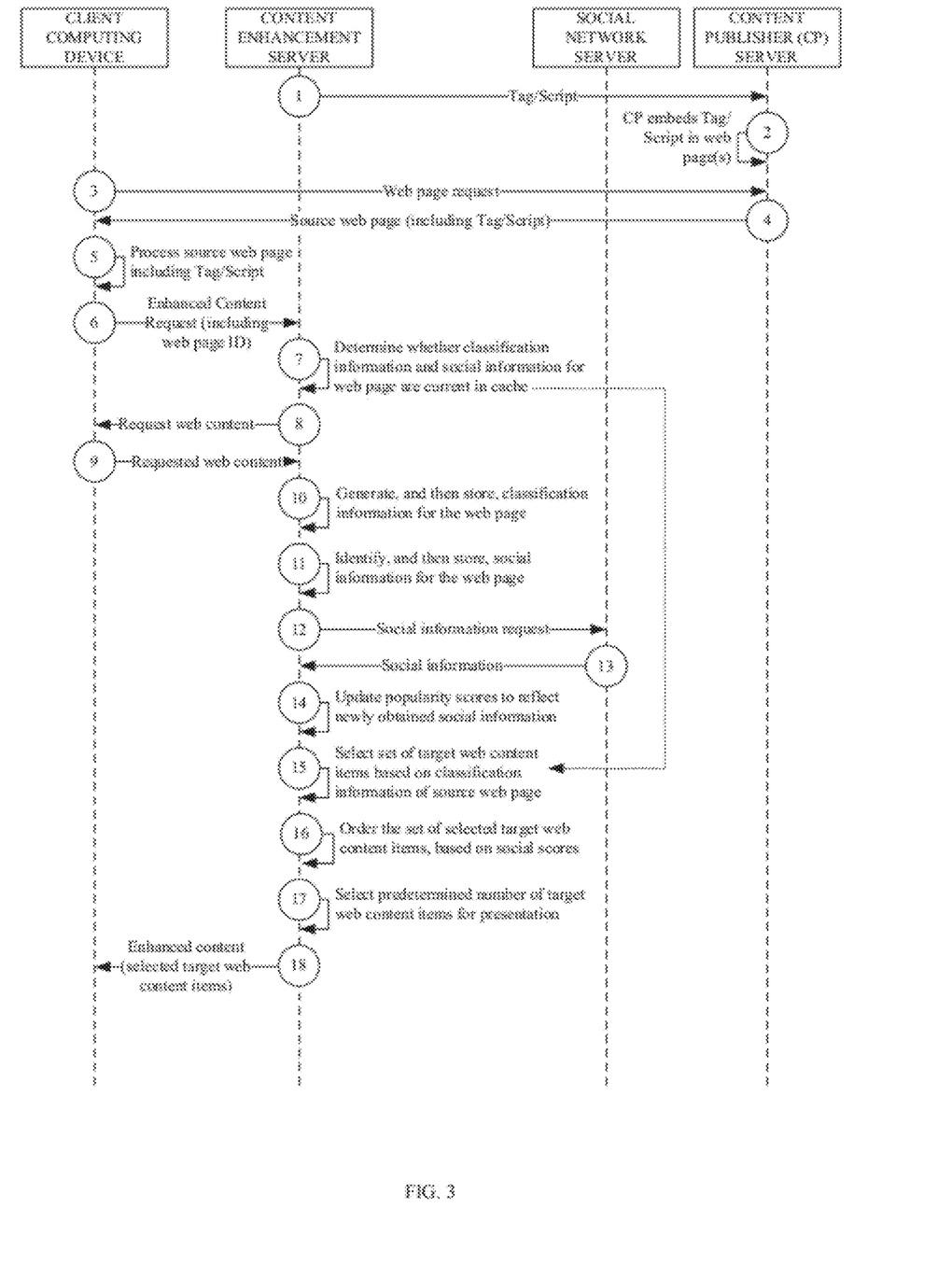
FIGS. 3 and 4 are flow diagrams illustrating the various operations that occur in two different methods of presenting enhanced web content, selected based in part on social information, according to an embodiment of the invention.

FIG. 3 is a flow diagram illustrating the various operations that occur in a method of presenting enhanced web content, selected based in part on social information, according to an embodiment of the invention. The method operations illustrated and described in connection with FIG. 3 presume that the content enhancement server does not have access to information indicating the identity of the user who requests, and is to view the source web page. As such, only publicly available social information is used to select the target web content presented to the viewing user.

In FIG. 3, the various method operations are illustrated with reference numbers enclosed by a circle. At method operation 1, a content enhancement server communicates a tag including or associated with a script, for embedding in a web page of the content publisher. Accordingly, at method operation 2, the tag or script is embedded into a web page by the content publisher server. The extent to which method operations 1 and 2 are automated may vary greatly from one embodiment to the next. As described below, when embedded in a content publisher's source web page and invoked by a client computing device, the tag or script will cause the client computing device to perform various operations, including communicating a request for enhanced content to the content enhancement server, thereby enabling the content enhancement server to communicate the enhanced content to the client for presentation with the source web page.

At method operation 3, a client computing device directs a web page request to the content publisher server, such that the request is for a web page that has an embedded tag or script received from the content enhancement server, or an operator of the content enhancement server. In response to the client request, the content publisher server communicates a source web page (including the tag/script) to the requesting client computing device. Next, the client computing device processes the received source web page, including the tag/script. With some embodiments, the tag/script, when processed by the client computing device will invoke a script that analyzes the source web page and generates a web page identifier. This web page identifier may be generated, for example, by performing a hash operation on some or all of the web content of the web page. In any case, at method operation 6, as a result of processing the tag/script, the client computing device will communicate a content request (e.g., enhanced content request), including the web page ID to the content enhancement server. At method operation 7, the content enhancement server receives the request, and determines whether classification information and/or social information for the source web page identified by the web page identifier resides in storage (e.g., a database or cache) accessible to the content enhancement server. If both the classification and social information are determined to be in the cache or database, and current, the content enhancement server proceeds by selecting a set of target web content items (e.g., web pages) that are known to include web content that relates to the web content of the source web page, at operation 15. For example, with some embodiments, the target web content will be selected because it is associated with a topic or subject matter with which the source web page is associated. If the source web page has been recently analyzed, the content enhancement server can identify the topics or subject matters with which the source web page relates by performing a database lookup operation, or otherwise retrieving the information from storage. Once the topics or subject matters of the source web page are identified, identifying the target web content items is achieved by performing a second database lookup operation, or otherwise selecting from storage the web content items that are assigned to the same topics or subject matters as the source web content.

Next, at method operation 16, the selected set of web content items are ordered or ranked based on a popularity score assigned to each item of web content. The popularity scores are based on publicly available social information, such as the number of comments associated with an item of web content, the number of times users have shared (e.g., tweeted, reposted, emailed, etc.) a particular item of web content, the number of persons who have bookmarked an item of web content, the number of times that a particular item of web content has been requested, and so on. At method operation 17, a predetermined number of target web content items are selected for presentation with the source web page. For instance, with some embodiments, the target web content items are assigned a social score that is based on some combination of a relevance factor or score, and a popularity score. Finally, at method operation 18, the content enhancement server communicates the selected items of target web content to the client computing device for presentation to the user with the source web page.

If, at method operation 7, the classification information for the source web page is not know (e.g., not already in the cache, or storage), then at method operation 8, the content enhancement server will request that the client computing device send web content from the source web page to the content enhancement server for analysis. The web content may be communicated in predetermined sized chunks of data. With some embodiments, the chunks are processed as received, such that only a number of chunks need to be communicated to allow the content enhancement server to ascertain the topics or subject matters to which the source web page relates. In other embodiments, at method operation 9, the entire web page may be communicated from the client computing device to the content enhancement server.

At method operation 10, once the web content from the source web page has been received, the content enhancement server analyzes the web content to classify the web content, for example, by assigning the web content to one or more topics or subject matters. This classification information is then used as the basis for selecting target web content items, and is also stored for subsequent use. In addition, at method operation 11, the content enhancement server analyzes the source web content to identify any social information within the source web page that may be used in deriving a popularity score for the source web page. With some embodiments, the content enhancement server may additionally poll one or more social network services for publicly available social information concerning the source web page, for example, as indicated in FIG. 3 by method operation 12. The social network server then responds with the appropriate requested social information at method operation 13. At method operation 14, the content enhancement server updates or generates a popularity score for the source web page, based on the various social information obtained from the source web page, and/or the social network server. Although the popularity score of the source web page is not used to select target web content items for presentation with the source web page, the popularity score may be used in a subsequent request for enhanced content, where the source web page is presented as an item of target web content (e.g., presented as content of potential interest, based on its relevance and popularity).

Figure 4:
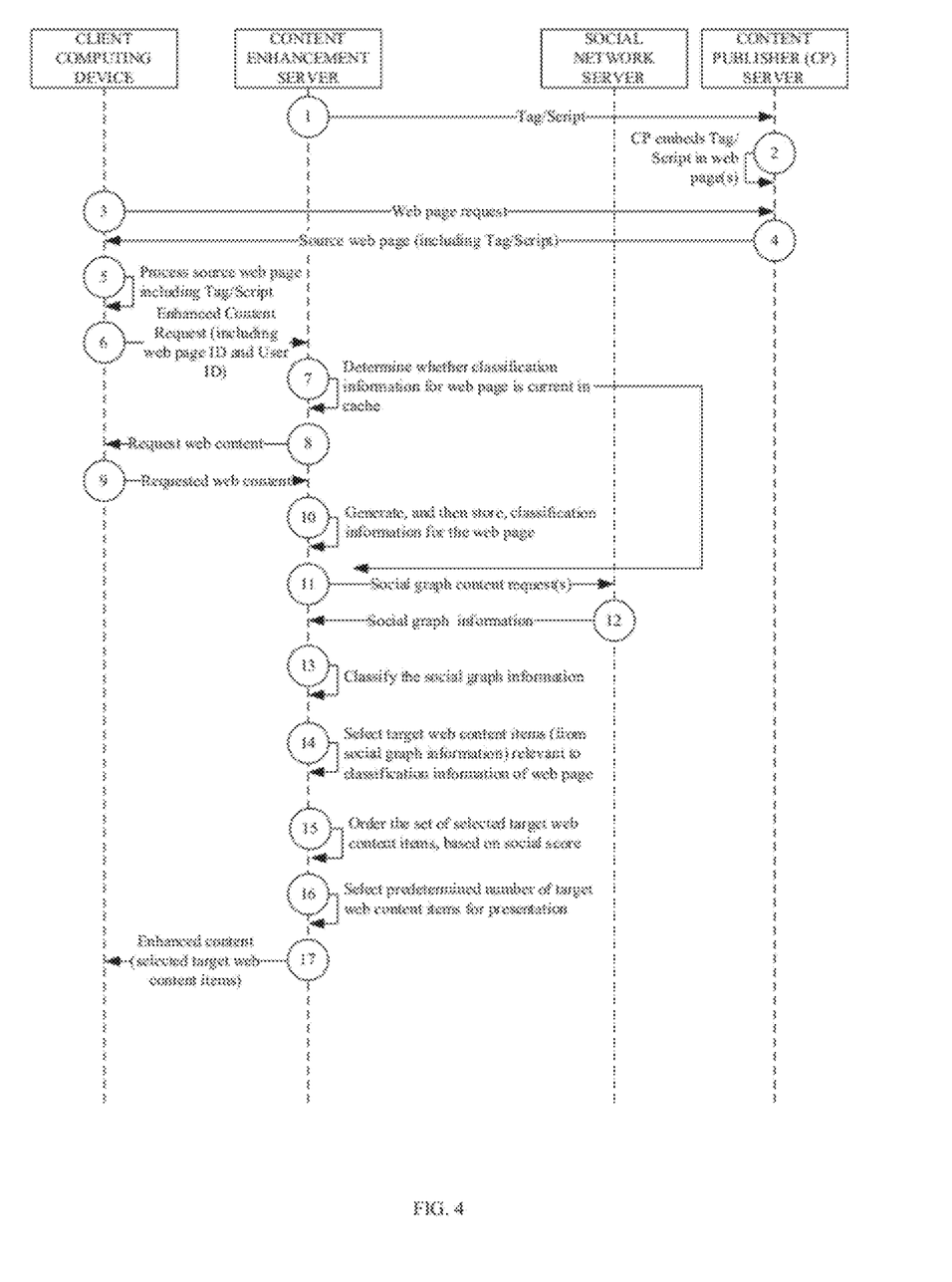

FIG. 4 is a flow diagram illustrating the various operations that occur in a method of presenting enhanced web content including information obtained via a user's social graph, according to an embodiment of the invention. Whereas the method described and presented in connection with FIG. 3 presumed that the content enhancement server did not have access to information indicating the identity of the user viewing the source web page, the method shown in FIG. 4 presumes that the content enhancement server has information indicating the identity of the user viewing the source web page. With some embodiments, the content enhancement server will request that the user authorize access of some information that indicates the user's identify. Such information may be included as part of a cookie, such as the case might be with the API associated with Facebook Connect, which enables members of a social network service to log into third-party websites, applications, and so forth, with their identity used with the social network service.

Accordingly, the content enhancement server can obtain web content specific to the viewing user's social graph, as defined by one or more social network services, and present this web content with the source web page. For example, the social graph information may include tweets, status updates, shared URL's, shared pictures, location information, etc., where the source of the information is a person in the viewing user's social graph. Accordingly, if a user requests a source web page related to the basketball team, the Los Angeles Lakers, the selected web content items may include tweets from the user's friends about the Lakers, basketball, the NBA, or sports.

The method illustrated in FIG. 4 begins at method operation 1, when a tag or script is provided to the content publisher, and the content publisher embeds or inserts the tag/script into a web page being served by the content publisher server (at method operation 2). Next, at method operation 3, the client computing device requests a web page containing the tag/script from the content publisher server. At method operation 4, the content publisher server communicates the source web page containing the tag/script to the client computing device. At operation 5, the client computing device processes the web page, including the tag/script. At operation 6, as a result of processing the tag/script, the client computing device communicates a request for enhanced content to the content enhancement server. In addition, with some embodiments, information identifying the user is communicated with the request, assuming the user has previously logged in to a particular social network service, and provided the content enhancement service with authorization to access information associated with the user's social graph.

At method operation 7, the content enhancement server determines whether classification information (e.g., topics or subject matters to which the source web page relates) is current in a cache, or other storage. If the classification information for the source web page is available and current, then it is recalled from storage, and at method operation 11, the content enhancement server requests (e.g., via one or more API requests) social graph information or content from one or more social network services. The social graph information or content is received by the content enhancement server at method operation 12. At method operation 13, the social graph information is classified, for example, by analyzing the information to determine the topics or subject matters to which the content relates. At method operation 14, the content enhancement server selects target web content items from the received social graph information based on their relevance (e.g., relatedness by topic) to the source web content. For instance, the content enhancement server will analyze the received social graph information received from the social network services to identify those items of web content that match the context of the web content of the source web page. At method operation 15, the selected items of web content are ordered based on social scores that are derived or computed based on a combination of a relevance score and a social graph score, representing a measure of the distance between the source or author of the web content item and the viewing users. For example, the selected items of web content may be ordered based on the distance between the author or source of a particular item of web content and the viewing user, as indicated by the social graph information of the viewing user. Finally, at method operation 16, a predetermined number of target content items are selected for presentation to the viewing user with the source web page, and at operation 17, the selected web content items are communicated to the client computing device for presentation.

With some embodiments, the social score with which the content items are ranked or ordered may be dependent upon the relevance of the content item to the source web page in combination with the distance between the source/author of the target web content item and the viewing user, as well as some additional social information associated with the content item. For instance, the social information may include the number of times that users of a particular social network service have commented on a particular content item, shared the particular content item, and so forth.

Figure 5:
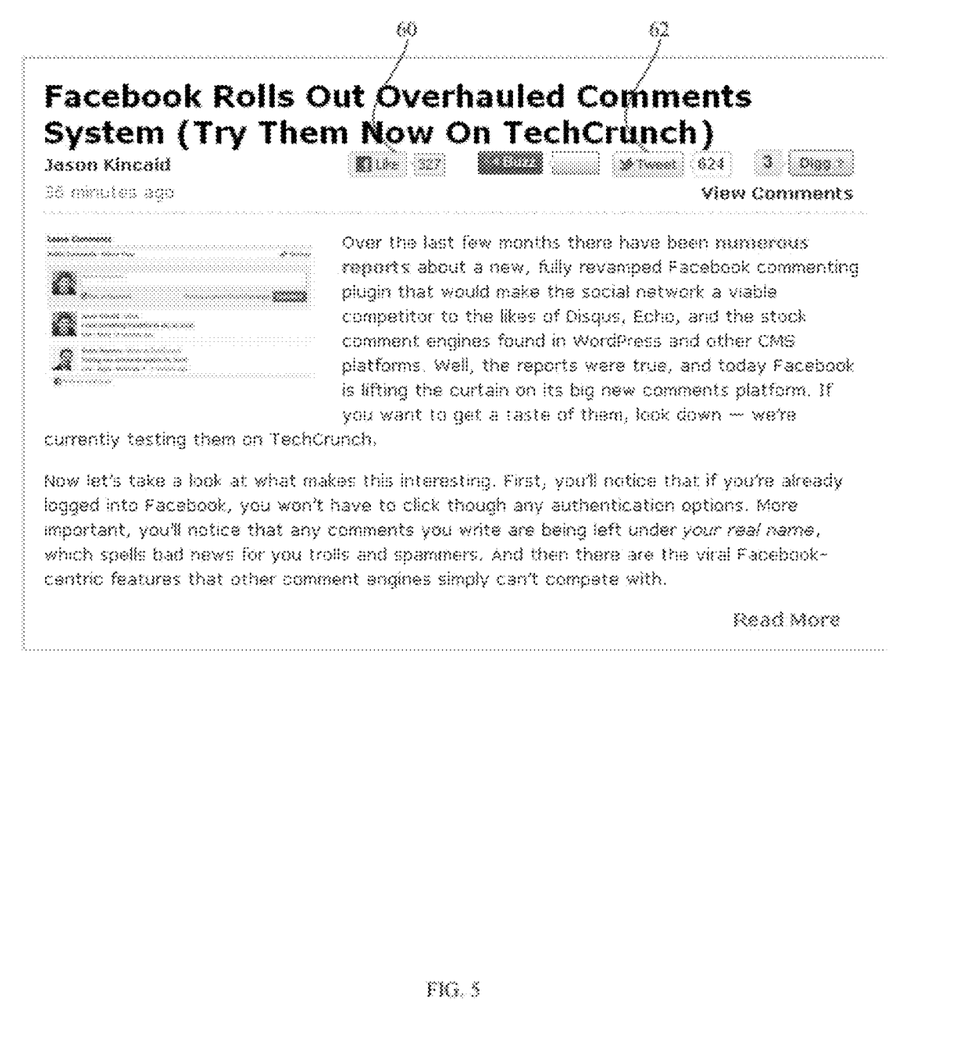
FIG. 5 is an example screen shot of an item of web content, including social information according to some embodiments of the invention.

FIG. 5 is an example screen shot of an item of web content, including publicly available social information according to some embodiments of the invention. The example screen shot in FIG. 5 is an item of web content (e.g., a blog posting) that includes publicly available social information from which the popularity of the content can be assessed. For instance, in FIG. 5, the user interface element with reference number 60 indicates that three-hundred twenty-seven users of a social network service have indicated that they "like" the blog posting. Similarly, the user interface element with reference number 62 indicates that six-hundred twenty-four users of a micro-blogging social service have shared or published a tweet of the blog posting. With some embodiments, the content enhancement server can parse the blog posting to identify this publicly available social information and then user the information to derive a popularity score for the blog posting.

Figure 6:
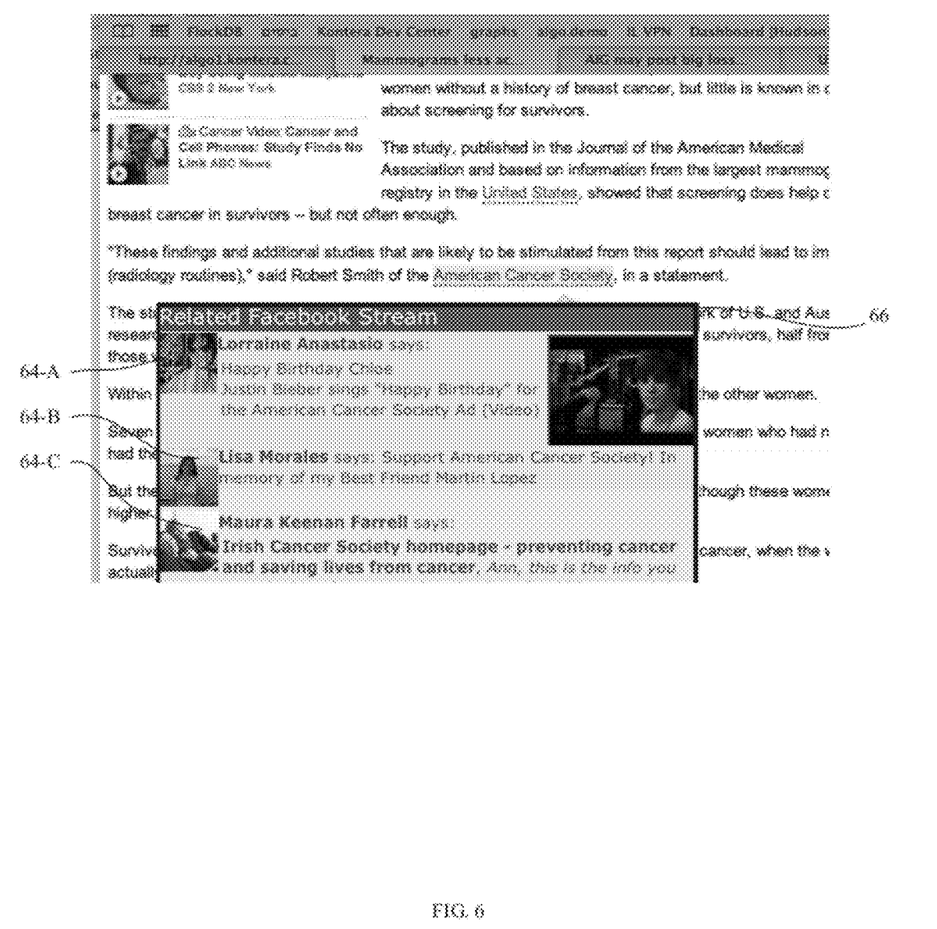
FIGS. 6 through 7 show various user interfaces with enhanced web content to be presented with a source web page, according to some embodiments of the invention.
Figure 7:
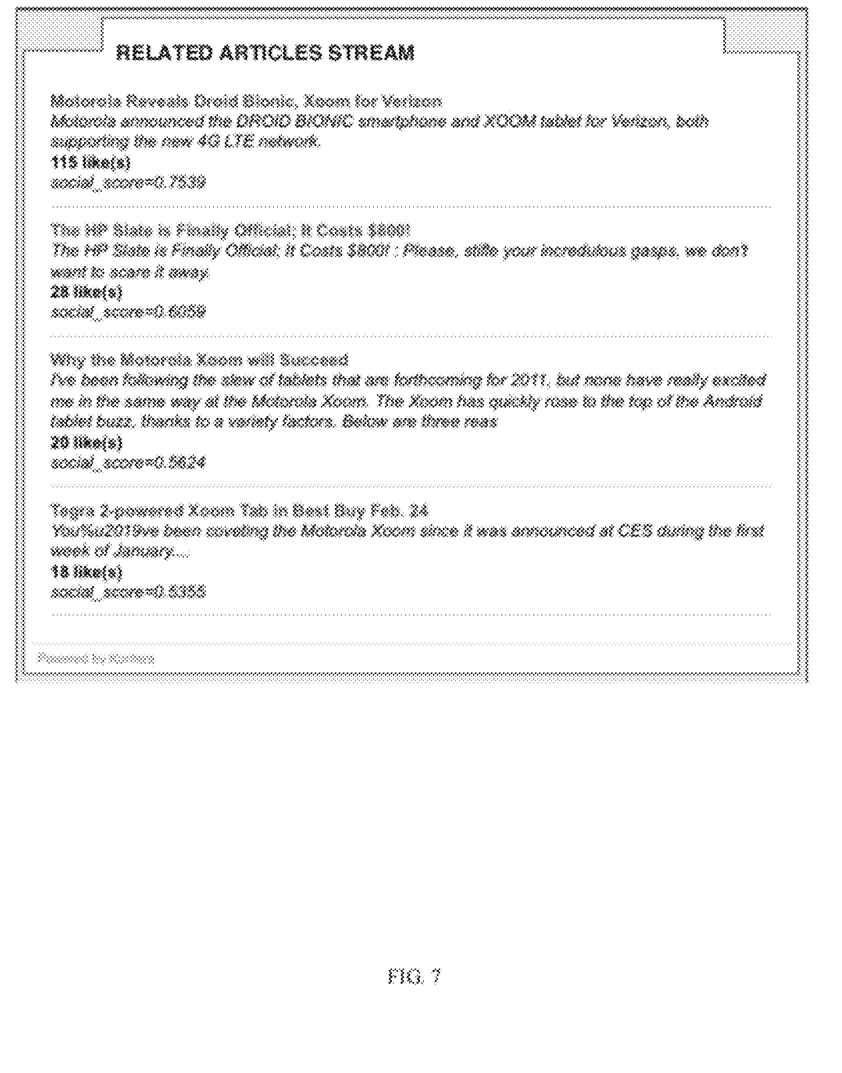
Figure 8:
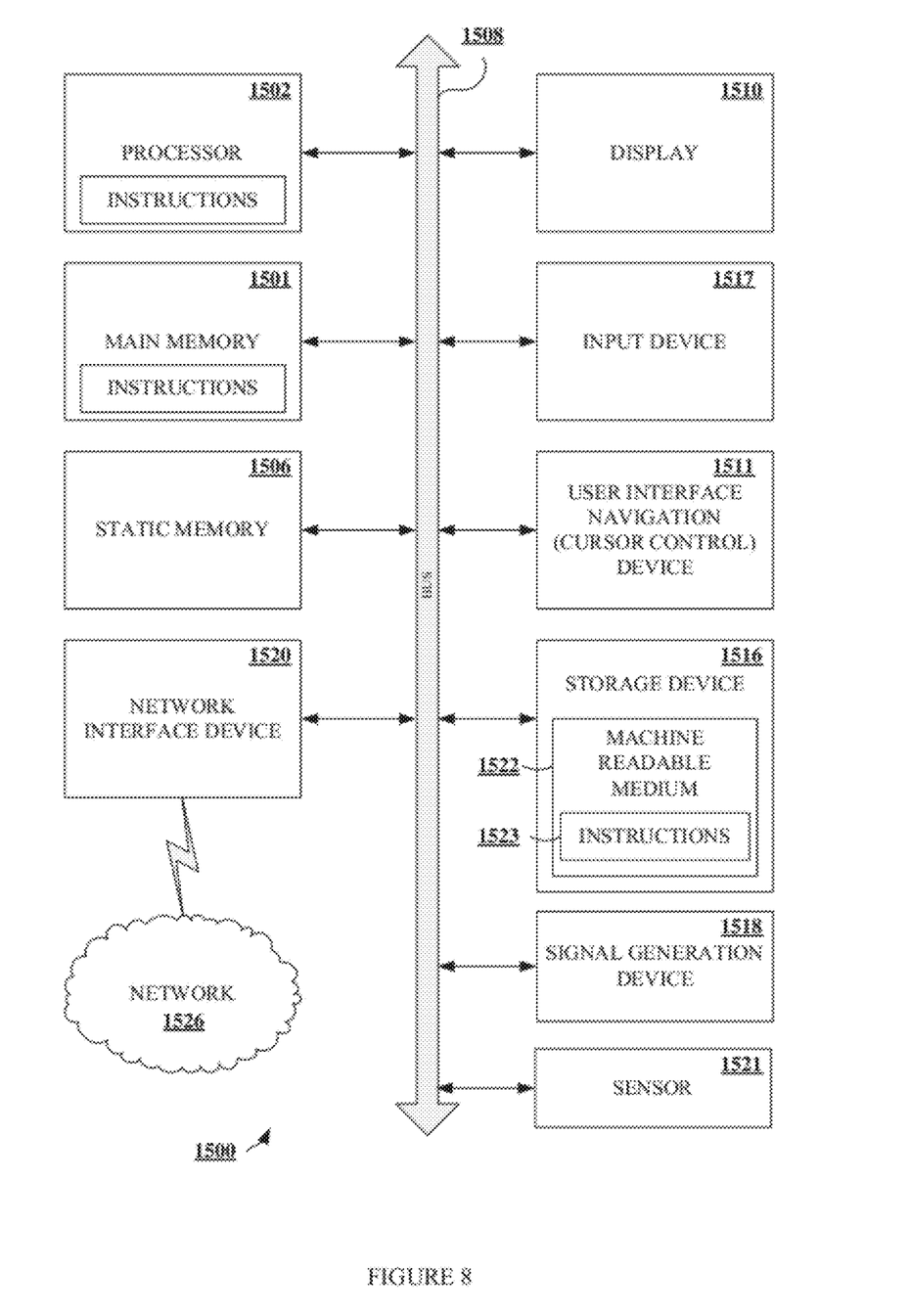
FIG. 8 is a block diagram of a machine in the form of a computing device within which a set of instructions, for causing the machine to perform any one or more of the methodologies discussed herein, may be executed.

FIGS. 6 through 8 show various user interfaces with enhanced web content, selected by a content enhancement server based on a combination of relevance (with respect to the source web page) and popularity, to be presented with a source web page, according to some embodiments of the invention. As illustrated in FIG. 6, the target web content items include messages 64-A, 64-B and 64-C selected from a particular social network service. The messages have been posted by persons within the social graph of the user who has requested, and is now viewing, the source web content. In FIG. 6, the target web content items are displayed in a pop-up window or content box 66 when an event is detected in connection with a highlighted keyword (e.g., "American Cancer Society."

FIG. 7 shows an example of a user interface element displaying a single item of target web content under the heading, "Related Articles Stream." In this example, the selected target web content that is presented includes a title for a news article and a brief summary of the article. In addition, the social score for the content item is presented, as well as the social information from which the social score was derived.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least sonic of the operations may be performed by a group of computers (as examples of machines including processors), these operations being accessible via a network (e.g., the Internet) and via one or more appropriate interfaces (e.g., Application Program Interfaces (APIs)).

FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    receiving, from a client computing device, a request for web content to be presented in association with a web page presented at the client computing device;
    determining a topic to which the web page presented at the client computing device relates;
    identifying a set of social graph content items relating to the topic, each of the set of social graph content items including a content portion and social information portion;
    for each social graph content item of the set of social graph content items, performing at least the following operations:
        generating a popularity score for the social graph content item based on an analysis of the social information portion, the analysis popularity score representing a measure of expressions of interest by users of a social network service with respect to the content portion, the expressions of interest corresponding to a particular activity undertaken by viewers of the social graph content item, the particular activity being any one of "liking" of the social graph content item, sharing of the social graph content item, or "tweeting" of social graph web content item;
        generating a relevance score for the social graph content item based on an analysis of the content portion, the relevance score representing a measure of relatedness between the topic to which the web page relates and a topic to which the content portion relates; and
        deriving a social score for the social graph content item a combination of the relevance score and the popularity score; and
    selecting a predetermined number of the set of social graph content items based on their respective social scores; and
    communicating the predetermined number of the set of social graph content items as the web content to be presented in association with the web page presented at the client computing device.

2. The method of claim 1, wherein the request for web content received from the client computing device is received as a result of the client computing device processing a script referenced in a source document of the web page being presented at the client computing device.

3. The method of claim 1, wherein the request for the web content includes information from the client device identifying the web page and the identifying of the set of social graph content items includes programmatically requesting the set of social graph content items from the social network service.

4. The method of claim 1, wherein the expressions of interest correspond to any one of:
    a count of the number of user-submitted comments associated with the web content item;
    a count of the number of times the content item has been shared with others via a social network service;
    a count of the number of times a user has bookmarked the web content item; and
    a count of the number of "likes" associated with the web content item.

5. The method of claim 1, wherein the determining of the topic to which the web page relates includes using an identifier identifying the web page to perform a look-up operation in a database table, the topic of the web page being included in a record of the database table.

6. The method of claim 1, wherein the determining of the topic to which the web page relates includes:
   determining that the web page has not previously been analyzed to identify a topic to which the web page relates, and in response, using a URL of the web page to request an instance of the web page from a server hosting the web page;
   receiving the instance of the web page from the server hosting the web page; and
   analyzing text of the web page to identify one or more topics to which the text of the web page relates.

7. The method of claim 1, wherein the determining of the topic to which the web page relates includes:
   determining that the web page has not previously been analyzed to identify a topic to which the web page relates, and in response, communicating to the client computing device a request for content of the web page;
   receiving chunks of content of the web page from the client computing device; and
   analyzing the received chunks of content of the web page to identify one or more topics to which the content of the web page relates.

8. The method of claim 1, wherein the communicating of the one or more social graph content items to the client computing device for presentation in association with the web page presented at the client computing device includes generating web page modification instructions to be communicated to the client computing device, the web page modifications instructions, when processed at the client computing device, causing one or more words or phrases in text of the web page to be converted to an interactive link such that the one or more social graph content item is presented upon detection of some interaction with the interactive link.

9. A system comprising:
   a processor to execute instructions;
   a memory device in communication with the processor and storing executable instructions, which, when executed by the processor cause the system to, at least:
   receive, from a client computing device, a request for web content to be presented in association with a web page presented at the client computing device;
   determine a topic to which the web page presented at the client computing device relates;
   identify a set of social graph content items relating to the topic, each of the set of social graph content items including a content portion and social information portion;
   for each social graph content item of the set of social graph content items, perform at least the following operations:
      generate a popularity score for the social graph content item based on an analysis of the social information portion, the analysis popularity score representing a measure of expressions of interest by users of a social network service with respect to the content portion, the expressions of interest corresponding to a particular activity undertaken by viewers of the social graph content item, the particular activity being any one of "liking" of the social graph content item, sharing of the social graph content item, or "tweeting" of social graph web content item;
      generate a relevance score for the social graph content item based on an analysis of the content portion, the relevance score representing a measure of relatedness between the topic to which the web page relates and a topic to which the content portion relates; and
      derive a social score for the social graph content item based on a combination of the relevance score and the popularity score; and
   select a predetermined number of the set of social graph content items based on their respective social scores; and
   communicate the predetermined number of the set of social graph content items as the web content to be presented in association with the web page presented at the client computing device.

10. A method comprising:
   receiving, from a client computing device, a request for web content to be presented in association with a web page presented at the client computing device;
   determining a topic to which the web page presented at the client computing device relates;
   using information identifying the viewing-user of the web page presented at the client-computing device, communicating request to a social network service for a set of social graph content items associated with a social graph of the viewing-user, the social graph of the viewing-user including members of a social networking service with whom the viewing user is connected or following via the social networking service, each of the set of social graph content items including a content portion and social information portion, a topic to which each of the social graph content items relates having a relevance score with respect to the topic to which the web page presented at the client computing device relates and a popularity score representing a measure of expressions of interest by users of a social network service with respect to the content portion, the expressions of interest corresponding to a particular activity undertaken by viewers of the social graph content item, the particular activity being any one of "liking" of the social graph content item, sharing of the social graph content item, or "tweeting" of social graph web content item;
   receiving the set of social graph content items associated with the social graph of the viewing-user;
   selecting a predetermined number of the set of social graph content items based on their respective social scores; and
   communicating one or more of the set of social graph content items to the client computing device as the web content for presentation in association with the web page presented at the client computing device.

11. The method of claim 10, further comprising: ranking the social graph content items based on a social score associated with the social graph content items.

12. The method of claim 11, wherein the social score is based on a combination of a relevance score and a social graph score, the social graph score representing a distance between the viewing-user and a member of a social network service who is in the viewing-user's social graph as determined by an analysis of the social graph of the viewing user, the relevance score representing a relatedness between the topic to which the web page relates and a topic to which each of the social graph content items relates.

* * * * *

UNITED STATES PATENT AND TRADEMARK OFFICE
CERTIFICATE OF CORRECTION

| | | |
|---|---|---|
| PATENT NO. | : 9,792,657 B2 | Page 1 of 1 |
| APPLICATION NO. | : 13/410069 | |
| DATED | : October 17, 2017 | |
| INVENTOR(S) | : Shaham et al. | |

It is certified that error appears in the above-identified patent and that said Letters Patent is hereby corrected as shown below:

On the Title Page

In item (57), in "Abstract", in Column 2, Line 10, delete "asocial" and insert --a social-- therefor Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*